Patented Sept. 9, 1947

2,427,328

UNITED STATES PATENT OFFICE 2,427,328

PREGELATINIZED WAXY STARCH

Herman H. Schopmeyer and George E. Felton, Hammond, Ind., assignors to American Maize-Products Company, a corporation of Maine No Drawing. Application July 3, 1942, Serial No. 449,670

1 Claim. (Cl. 127—32)

This invention relates to a gelatinized starch of abnormally high water absorption. The invention relates particularly to such a starch characterized also by ready dispersibility in cold water to give a gel that is substantially free from set back when of moderate to relatively high concentrations and that has high film strength when in dried condition.

There is extensive use of pregelatinized cereal starches as sizes and adhesives in various industries and especially in the paper industry. The product desired for such use should have a very high water absorption value, disperse quickly when mixed in finely divided form with cold water to give pastes that do not undergo set back (form a stiff gel) when allowed to stand, and give films of high adhesive strength after drying. It has not been possible heretofore to make a pregelatinized cereal starch meeting these requirements.

Our invention provides a cereal starch product that meets all of the requirements and is sometimes referred to herein as "pregelatinized" inasmuch as the starch is gelatinized in advance of the time when it is used.

Briefly stated, the invention comprises the method of and the product resulting from gelatinizing waxy cereal starch and then drying the pregelatinized material for delivery to the place of use. In the preferred embodiment of the invention, waxy maize is the starch that is gelatinized and the waxy maize starch is first thinned, either with acid or by oxidation with a hypochlorite or like oxidizing agent, before being pregelatinized. In another embodiment of the invention, the gelatinization is effected by progressively increasing the moisture content and the temperature so that the starch containing the desired proportion of water for gelatinization is subjected to the maximum temperature of gelatinization for only a short period of time before being discharged from the equipment used in the gelatinization.

The product of the invention is a pregelatinized waxy starch that does not undergo set back when dispersed in hot or cold water and allowed to stand at concentrations that are much above those with which set back is experienced with pregelatinized ordinary starch. Furthermore, the pregelatinized waxy starch when made into a paste and used as an adhesive shows adhesive strength, as measured by the pick test, that in some instances is as much as four times as great as that of pregelatinized corn starch prepared under comparable conditions.

In a typical operation, waxy maize starch in moist condition, such as obtained for example as filter cake in a vacuum filtration of a suspension of the starch in water, is pasted in any suitable manner, as on a hot roll under conditions that are usual in the pasting of ordinary starch. Or the wet waxy starch is fed continuously through a gelatinization vessel such as a screw conveyor having open steam jets that deliver steam as a fine spray into the vessel at intervals spaced from each other in the direction of movement of the starch, the starch being finally discharged through an outlet from the vessel, all of the equipment and operation being conventional in pregelatinizing ordinary starch. The product is then dried in a usual type of pregelatinized starch drier and then is preferably finely milled. A combination flash drier and mill may be used for the purpose. Spray drying may be used.

In connection with the screw conveyor pasting, attention is directed particularly to the progressive introduction of moisture and heat in increments and the thorough distribution of the water made possible by the operation described. There is thus made possible the use of a minimum quantity of water to obtain thorough gelatinization without the introduction of such large amounts as to require evaporation of a large excess of unnecessary water. Thus, we may use water in total amount as low as 35 to 40 parts for 100 parts of water and starch mixtures. For incomplete pasting about 20 to 34 parts of water may be used.

The temperature of pregelatinization may be any one between the pasting temperature of the waxy starch (about 150° F.) and below the temperature of objectionable decomposition of the starch or excessively rapid evaporation of water.

The time of pregelatinization may be no longer than required to bring the waxy starch to the pasting temperature, the period required to establish the temperature varying obviously with the kind of apparatus used, its temperature, and the thickness of the mass or layer of starch to be warmed.

The pH of the starch during pregelatinization may vary considerably as from 3.5 to 8, about 5.5 to 7 being preferable.

While there may be used for the present purpose waxy starch from any known cereal source of such starch, for example, from waxy sorghum, the invention gives particularly satisfactory results when the starch used is from waxy maize. The invention will be first illustrated, therefore, by description in connection with the use of such waxy maize starch.

Example 1

In a typical operation wet waxy maize starch filter cake of moisture content of about 30% is introduced into a conventional pasting conveyor and steam is sprayed in through spaced inlets. The water content is increased by about 2 to 5% for each steam jet under which the starch passes, so that the product issues through the discharge opening with a moisture content of about 38 to 45%. As the starch passes through the conveyor, there is also a progressive increase of the temperature up to the maximum which should be about 160 to 180° F. and preferably about 170° F. The temperature of the moist mass is maintained at this point for only a short period of time, say for about one fourth to one minute, the total time required for the passage of the starch through the conveyor being suitably about 1.5 to 5 minutes.

There is thus obtained a very uniform wetting and gelatinization of the waxy starch without undercooking or overcooking of any substantial proportion of the starch.

The pregelatinized material is delivered from the discharge opening to a flash drier and mill combined.

In this manner, there has been made from table head waxy starch a product having a water absorption of 15.2 as compared to 6.2 for table head corn starch similarly treated.

When the starches used as raw material were degerminated waxy maize and degerminated ordinary corn, the water absorption values were 15.2 and 5.6, respectively.

The absorption value referred to is determined by suspending 10 g. of starch in 100 cc. of cold water, allowing the mixture to stand for one hour and then filtering. The amount of filtrate in cc. deducted from 100 cc. gives the volume of water absorbed by 10 g. of the starch. This figure for the number of cc. of water absorbed divided by ten gives the so-called water absorption or the absorption per gram of the starch. Pregelatinized waxy starch made as described herein will usually have a water absorption substantially in excess of 10.

Example II

In place of untreated waxy starch as the raw material to be pregelatinized, there is used to advantage waxy starch that has been initially modified by a chemical treatment.

Thus, there may be used acid thinned or thin boiling waxy maize starch, the thin boiling starch being one prepared in any manner described in copending application Serial No. 350,167 for U. S. patent filed by the present applicants on August 2, 1940, and entitled Starch product and method of making, issued as Patent 2,319,637 on May 18, 1943.

An example of the making of pregelatinized thin boiling waxy starch from such pretreated starch follows.

Waxy maize starch is formed into an aqueous slurry of density approximately 16° Baumé and sulfuric acid is added to establish the pH at approximately 1.5. The slurry is then warmed and held at about 120° F. until thinned to the desired extent. The degree of thinning is determined by test for the so-called alkali fluidity, this test being standard in the corn starch industry and the alkali fluidity corresponding to the volume of outflow in cc. obtained with the starch product in standard time with a funnel which in the same time delivers 100 cc. of water.

After thinning to the desired extent is obtained, say to an alkali fluidity of 20 to 90, the granules of acid treated waxy starch are separated from the liquid by filtration.

The granules so separated contain approximately 50% of water. They are then heated with steam to a temperature of about 160° to 180° F. or higher to produce pre-gelatinization.

The product so made shows a remarkably high pick test when applied to paper and tested in usual manner, the pick test being much higher than obtained by the corresponding treatment of common cereal starches. Also the pregelatinized waxy starches have very large water absorption values and high solubility in water. They are particularly adapted for use as a size in the manufacture of paper or as an adhesive.

Ten grams of the acid thinned waxy maize starch of fluidity 20 to 50, when pregelatinized as described, absorbed all of the 100 parts of water in the water absorption test and consequently gave no filtrate at all. Acid thinned waxy maize starch originally of 90 fluidity after being pregelatinized was tested likewise. This material had sufficient solubility that the starch itself passed practically completely through the filter paper with the water.

The pick tests, which are made as described in the said application 350,167, measures the adhesive strength of the starch film on paper. With acid thinned waxy starch and acid thinned common corn starch as the starches that are pregelatinized, the following pick tests were obtained:

| Kind of Acid Thinned Starch Used | Alkali Fluidity Before Pregelatinization | Pick Test of Pregelatinized Material |
|---|---|---|
| Waxy Maize | 20 | 6.0 |
| Do | 50 | 5.6 |
| Do | 90 | 5.0 |
| Corn Starch | 20 | 1.0 |
| Do | 50 | 1.0 |
| Do | 90 | 1.0 |

It will be noted from the above table that the adhesive strength of the pregelatinized waxy starch is 5 to 6 times that of the common corn starch similarly treated. While the exact ratios of adhesive strength will vary somewhat in different preparations, it is evident that the pick test of the pregelatinized waxy starch is much greater than that of the pregelatinized common corn starch.

Example 3

In another modification of the invention waxy maize starch was first treated with an oxidizing compound in manner that is conventional in the oxidation of other cereal starches. Thus, the waxy maize starch was made into a slurry with water, the proportion of starch to water used being such that the finished slurry had a density of approximately 20° Baumé. To this there was added a solution of sodium hypochlorite made by passing chlorine through soda ash solutions. There is thus obtained modification due to the oxidizing effect of the hypochlorite in the presence of the resulting alkaline hypochlorite solution.

In general, the oxidized waxy starch may be made in any manner described in copending application Serial No. 351,914 for U. S. Patent, filed by the present applicants on August 8, 1940, and entitled Waxy starch product and method of making, issued as Patent 2,354,838 on August 1, 1944. The oxidized starch is finally separated from the remaining liquid as described in the said application.

After the oxidation is completed, then the oxidized product is pregelatinized by heating with water and then is dried and milled as described elsewhere herein.

Various proportions of chlorine to the waxy starch may be used, increasing proportions of chlorine being found to give greater modification. A satisfactorily high pick test with the oxidized waxy starch is obtained, however, with relatively low concentrations of chlorine, say in the range of about 1 to 3% of actual chlorine on the dry weight of the starch. Higher proportions of chlorine are unnecessary with the waxy starch. Thus, there was obtained with 1.25% of chlorine used in the hypochlorite treatment a waxy starch that after gelatinization had a pick test of 7.8, whereas 5% of chlorine on the weight of ordinary corn starch was required in making a product that in gelatinized condition had a pick test of 6.2.

The preliminary modification and subsequent pregelatinization described herein may begin with highly purified or refined waxy starch or the less pure material obtained only by steeping and degerminating the grains of waxy maize and then milling the remaining mixture of starch, protein and fiber. Also, the processing may be applied to table head starch as the raw material, this starch being substantially free from all impurities except protein.

It will be understood also that it is intended to cover all changes and modifications of the example of the invention herein chosen for the purpose of illustration which do not constitute departures from the spirit and scope of the invention.

What we claim is:

Cold water dispersible waxy cereal starch in the condition of having been gelatinized by being warmed in contact with water to the pasting temperature of the starch and then dried, characterized by water absorption in excess of 10 parts by weight of water for each part of the waxy starch as determined by suspending the dry starch in cold water, allowing the suspension to stand for one hour, filtering the suspension, and calculating, from the amount of water used less the amount of filtrate, the proportion of water retained on the filter for each unit of starch used.

HERMAN H. SCHOPMEYER.
GEORGE E. FELTON.

REFERENCES CITED

The following references are of record in the file of this patent:

UNITED STATES PATENTS

| Number | Name | Date |
|---|---|---|
| 2,178,235 | Lauterbach | Oct. 31, 1939 |
| 2,216,179 | Bauer | Oct. 1, 1940 |
| 1,105,567 | Kantorowicz | July 28, 1914 |
| 2,171,796 | Kelling | Sept. 5, 1939 |
| 2,291,041 | Kauffmann | July 28, 1942 |
| 2,070,576 | Bochskandl | Feb. 16, 1937 |

OTHER REFERENCES

Brink, "The Nature of Waxy Starch," The Biochem. Journ., vol. 22, #8, pages 1349–1361.

Weatherwax, "A Rare Carbohydrate in Waxy Maize," Genetics 7: 568 to 572; 1922.

Brink et al., Genetics, vol. 11, pages 163–199 (1926).

Bear et al., J. Am. Chem. Soc. 63, pages 2298 to 2305 (1941).

Haworth et al., Jour. Chem. Soc., pages 177–181 (1935).

Newton et al., Cereal Chem., vol. 17, pages 342–355 (1940).

Caldwell, Jour. Am. Chem. Soc., vol. 63, pages 2876 to end.

Morgan, Ind. and Engr. Chem., Anal. Ed., vol. 12, pages 313–317 (1940).

Brimhall et al., Ind. and Eng. Chem., Anal. Ed., vol. 11, pages 358–361 (1939).